Sept. 5, 1939.  R. P. LEWIS  2,171,833
AUTOMATIC CLUTCH MECHANISM
Filed Sept. 20, 1932  2 Sheets-Sheet 1
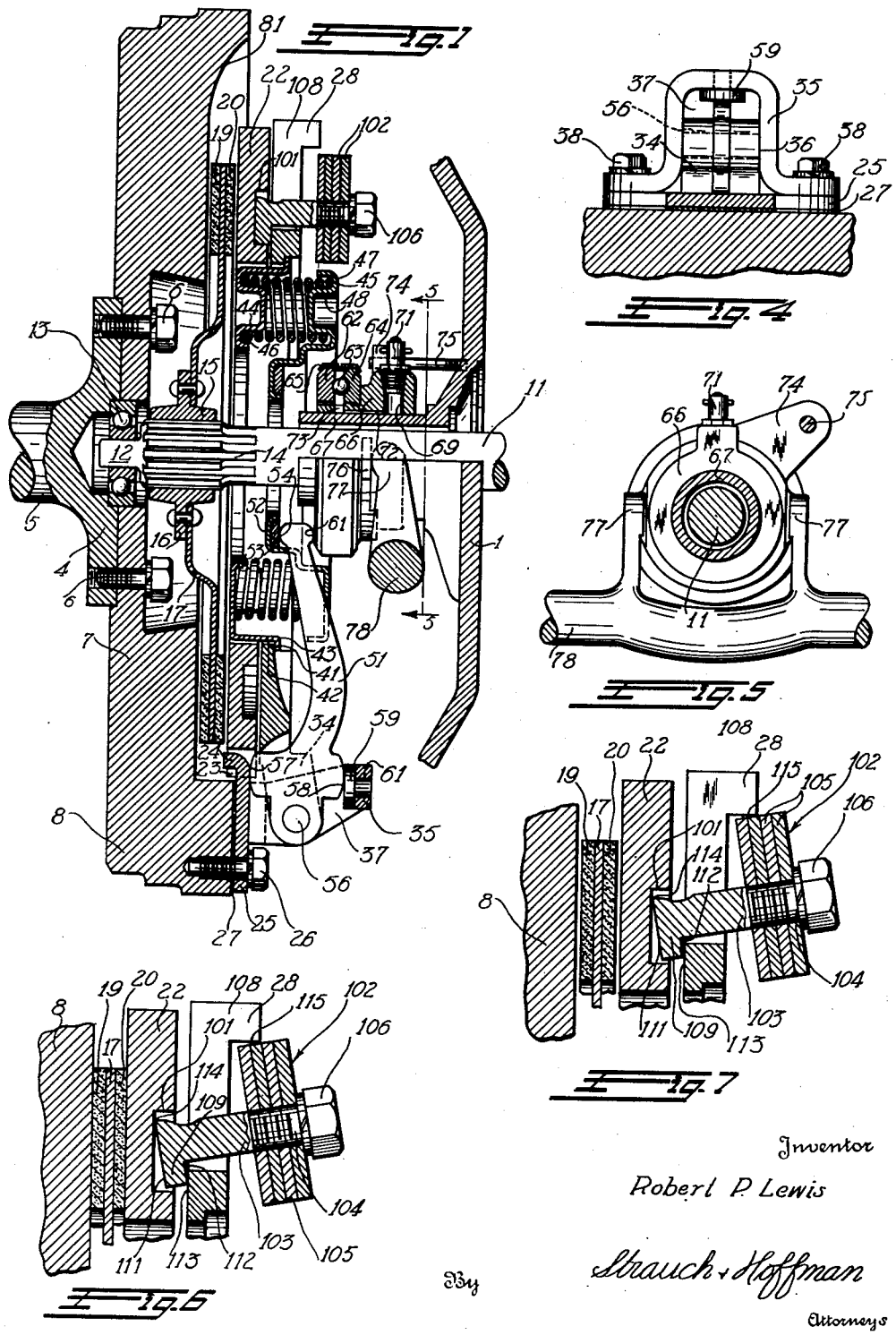
Inventor
Robert P. Lewis
By Strauch & Hoffman
Attorneys

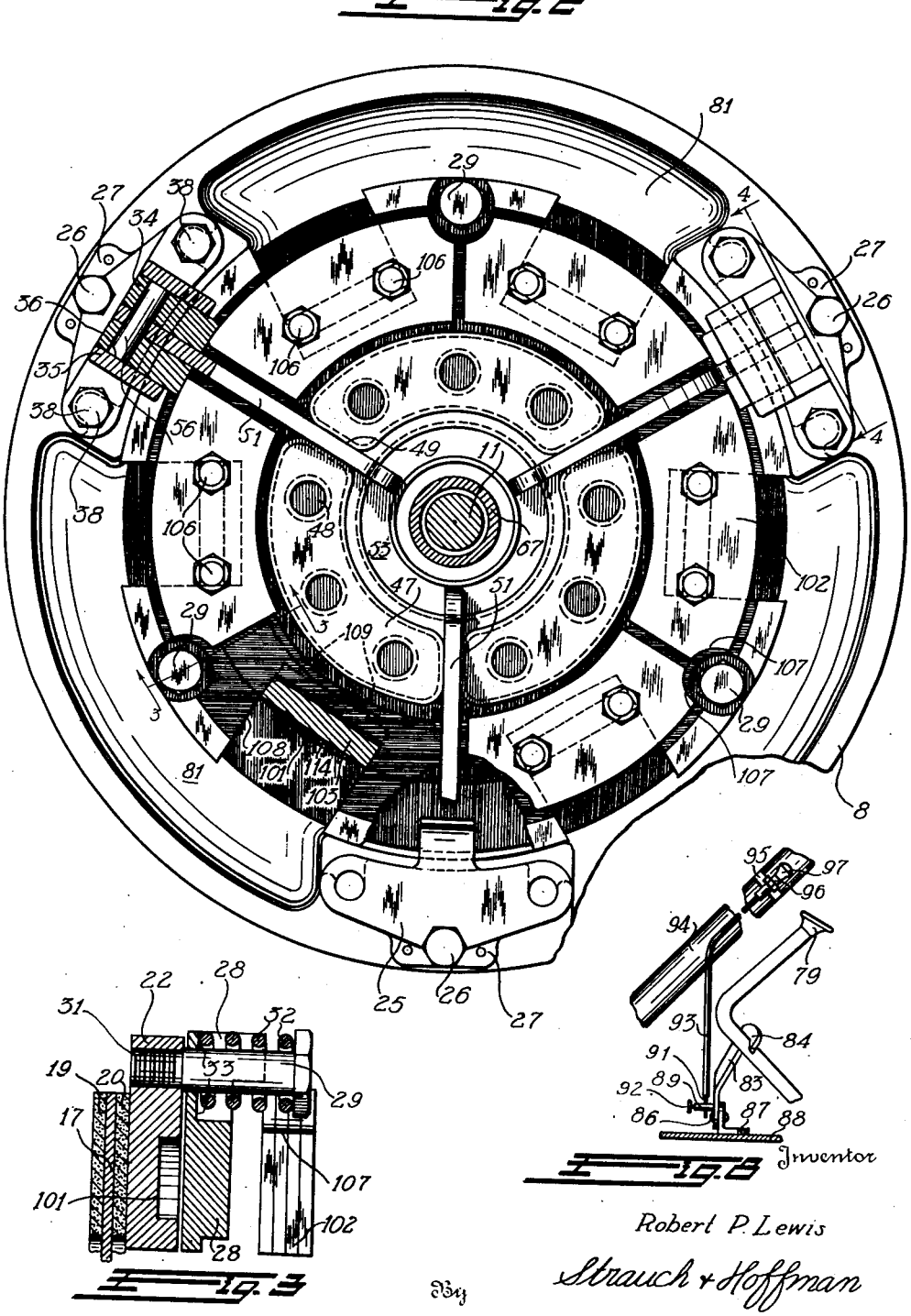

Patented Sept. 5, 1939

2,171,833

UNITED STATES PATENT OFFICE 2,171,833

AUTOMATIC CLUTCH MECHANISM

Robert P. Lewis, Toledo, Ohio, assignor to The Automatic Drive & Transmission Company, Gloucester City, N. J., a corporation of New Jersey Application September 20, 1932, Serial No. 634,047

6 Claims. (Cl. 192—105)

The present invention relates to automatic drive and clutch mechanisms adapted to transmit power from a driving to a driven shaft especially adapted for automotive motor vehicle and similar drives, but useful for a wide range of power transmitting applications.

More particularly, the present invention relates to automatic clutch mechanisms of the type wherein a movable clutch member is actuated in response to speed variations and in response to manual control for clutching and declutching purposes.

Automatic clutch mechanisms of the character mentioned that have been heretofore proposed possess the serious disadvantage that in order to withdraw the movable clutch member away for manual declutching, such clutch mechanisms are so designed that such declutching movement of the clutch member causes retraction of the speed responsive mechanisms. Even at moderately high speeds in such prior clutch constructions, it has been found that the opposing force exerted by the speed responsive mechanism is so great that the pedal pressure required renders it extremely difficult if not altogether impossible to manually withdraw the clutch member for declutching purposes.

Another defect inherent in automatic clutch mechanisms of the character mentioned that have been heretofore proposed is that the movable members, under the influence of the speed responsive mechanism, are moved into engagement with the other clutch members in misalignment with the result that clutch engagement occurs with a chattering and grabbing action, which in turn causes rapid wear of the facing material, and localized areas of the engaging members are heated to a high temperature with attendant warpage and distortion thereof, which in turn further impairs smooth clutch action, so that the effective life of the mechanisms is materially shortened.

Prior automatic clutch mechanisms of the character mentioned are found to possess the further objectionable characteristic, that the clutch plates are caused to come so solidly together in response to the action of the speed responsive mechanism, that in addition to the undesirable grabbing and chattering clutch engagement operation that results, severe shocks are often transmitted through the entire drive mechanism with the result that parts thereof often are distorted or actually broken under the stress of such shocks, and the engine is often caused to stall by such harsh clutch engagement.

In prior clutch mechanisms of the character mentioned the range of engine speeds over which the clutch mechanism moves from fully disengaged position into fully engaged condition is relatively small, so that the resultant clutch engagement is harsh and renders the mechanism totally impractical for incorporation in modern motor vehicles.

Prior clutch mechanisms of the character mentioned possess a further serious disadvantage that when the engine or other prime mover is stationary or operating at idling speeds, no provision is made for causing the plates to be brought into driving engagement for establishing a direct drive from the engine to the rear wheels of the vehicle. This is obviously a disadvantage for motor vehicle drives because in the winter when the engine is cold, and it is desired to turn the engine over by towing or coasting the vehicle, it is necessary to establish a direct drive from the engine to the rear wheels. Moreover, should the engine stall in a dangerous position as for example on a grade crossing a direct drive between the engine and the rear wheels of the vehicle is highly desirable so that the usual starting motor can be employed to pull the vehicle to safety in an emergency.

Accordingly it is a primary object of the present invention to provide an automatic clutch mechanism of the character mentioned that may be readily manufactured by low cost, quantity production methods, that will operate efficiently at all times, may be readily manually declutched regardless of the existing engine speed, and which will have a long useful life.

Another object of my invention is to provide a clutch mechanism of the character mentioned that is so designed that the speed responsive or automatically actuated clutch member may be readily manually withdrawn from clutched position regardless of the position taken by the automatic mechanism.

A further object of the present invention is to provide an automatic clutch mechanism of the character mentioned wherein the automatically actuated clutch member may be manually withdrawn from the clutch plates into declutched position regardless of the position of the automatic mechanism.

It is another object of the present invention to provide an automatic clutch mechanism which may be installed in vehicles to replace existing manual motor vehicle clutches, requiring no modification of the flywheel or the throwout mechanism employed in the existing manually operable clutches whatever.

A further object of my invention is to provide an automatic centrifugal clutch mechanism of the character mentioned, wherein the centrifugal mechanism is so designed that it will cause uniform distribution of pressure around the entire engaging area of the centrifugally actuated clutch member regardless of any slight inaccuracies present in the dimensions of the weight parts or plates due to defective machining operations, or inaccuracies of the parts resulting from manufacture thereof by low cost quantity production methods.

A further object of my invention is to provide a centrifugal clutch mechanism of the character mentioned wherein the centrifugal mechanism is caused to distribute the pressure developed thereby around the entire engaging area of the centrifugally actuated clutch member, and to so design the parts that uniform distribution of such pressure is assured throughout the life of the clutch mechanism, regardless of any slight wear that occurs between any of the parts thereof.

It is another object of my invention to provide a clutch mechanism of the character mentioned that is so constructed that the centrifugally actuated clutch member is not caused to come solidly into contact with the driven clutch member, but a resiliently yielding connection is always maintained between the parts, so that clutch engagement occurs smoothly and without the transmission of harmful shocks to the drive mechanism of the vehicle, thus avoiding damage thereto and producing a smoothly operating clutch mechanism.

A further object of the present invention is to provide an automatic centrifugal clutch mechanism of the character mentioned wherein the centrifugal weight mechanism directly engages the centrifugally actuated clutch members, but the weights react against a resilient reaction member, so that the pressure between the clutch plates is caused to build up at a slow rate, thereby materially increasing the range of engine speeds over which the entire clutch engagement operation occurs, and an automatic clutch mechanism having highly desirable operating characteristics is produced.

Another object of my invention is to provide a clutch mechanism of the character mentioned wherein the speed responsive mechanism reacts against a member whose motion is resisted by both the action and reaction of spring means.

A still further object is to provide an automatic drive and clutch mechanism of the character mentioned wherein the speed responsive mechanism reacts against a member whose motion is resisted by the reaction as well as the action of spring means and means are associated with the spring means for manually declutching the mechanism against the action of the spring means.

Another object of the present invention is to provide a clutch mechanism of the character mentioned wherein the clutch plates may be brought together in firm driving engagement when the engine is stationary or only operating at idling speeds, so that a direct drive from the engine to the rear wheels of the vehicle may be readily established.

Other objects of the present invention will become apparent as the description thereof proceeds in connection with the accompanying drawings, and will become apparent from the terms of the annexed claims.

As shown in the drawings:

Figure 1 is a longitudinal sectional view of a preferred embodiment of automatic drive and clutch mechanism embodying my present invention.

Figure 2 is a view of the clutch mechanism disclosed in Figure 1 as it appears when viewed from the right hand side of that figure, with the clutch housing and throwout mechanism removed therefrom, and certain parts are broken away and disassembled for purposes of illustrating certain details of construction.

Figure 3 is a detail sectional view taken on the line 3—3 of Figure 2 of the drawings.

Figure 4 is a detail sectional view taken approximately on the line 4—4 of Figure 2 of the drawings.

Figure 5 is a sectional view illustrating the clutch mechanism, the section being taken approximately on the line 5—5 of Figure 1 of the drawings.

Figure 6 is a fragmentary sectional view of the clutch plates and one of the centrifugal weights, illustrating the position taken by these elements when the plates are disclosed in clutched position under the influence of the centrifugal weights.

Figure 7 is a view similar to Figure 6 wherein the parts are illustrated in the positions they take when the engine is operating at speeds substantially above idling speeds, and the clutch pedal is disposed in depressed position.

Figure 8 is a diagrammatic elevational view of the controlling manual clutch pedal and the associated latch for holding it in automatic position, that may be utilized in controlling the clutch mechanism illustrated in Figures 1 to 7.

With continued reference to the drawings wherein like reference characters designate like parts throughout the several views thereof, the stationary clutch casing is designated generically at 1 and is broken away for purposes of illustration. Secured to flange 4 of engine or driving shaft 5, by means of bolts 6 or the like, in well known manner, is web portion 7 of a special type of flywheel.

Disposed in axial alignment with driving shaft 5, and mounted for rotation, is driven shaft 11, which is reduced at 12 and journaled in a suitable anti-friction pilot bearing assembly 13, mounted in a bore in the end of shaft 5 in well known manner.

Driven shaft 11 is adapted to have the other end thereof operably connected to a suitable gear changing apparatus (not shown) for amplifying the torque applied to the final driven member in well known manner. Shaft 11 has a splined portion 14 upon which a correspondingly splined hub 15 is slidably mounted. Hub 15 is provided with a flange 16 to which is secured, by means of rivets or the like, a driven disc 17. While I have disclosed disc 17 as being rigidly secured to flange 16 of hub 15, it is to be understood that if it is desired a resilient coupling of any well known construction may be interposed between these two members for the purpose of dampening out torsional vibrations set up in the crank shaft of the engine.

Each face of disc 17 near the periphery thereof is provided with a facing 19 and 20 respectively, which may consist of any material that has the required characteristics to give the correct frictional gripping force, and at the same time has wearing qualities adapting it for this purpose. I prefer, however, to use the lubricated type of material disclosed in the application of Charles B. Heinrich, Serial No. 580,172, filed December 10, 1931, embodying large percentages of solid lubricant which in practice have given very satisfactory results in a slipping drive and clutch mechanism of this character. Frictional facings 19 and 20 may be secured to disc 17 in any suitable manner as for instance by rivets or the like.

Disc 17 constitutes the driven member and facing 19 secured thereto, cooperates with the flat face of flywheel 8 and is adapted to be engaged and frictionally driven thereby. Facing 20, provided on disc 17, cooperates with a plate 22 which will be hereinafter termed the automatic plate for the reason that it is automatically actuated and is adapted to engage and clamp driven member 17 between it and the flat face of the flywheel. Plate 22 is of substantial thickness so that it may possess a sufficient degree of rigidity to prevent distortion and warpage thereof during operating conditions.

Plate 22 is driven with flywheel 8, and is permitted to move axially thereof for clutching and declutching purposes, by means of key slots 23 formed therein, which are disposed at preferably 120° intervals around the periphery of plate 22, each of which cooperates with the curved extremity of driving plate or key member 25, secured to the flywheel face by means of cap screws 26 or the like. Removably disposed between plates 25 and the face of the flywheel are a plurality of shims 27 which may be inserted or removed from their positions for the purpose of adjusting automatic plate 22 toward and away from the flywheel face in the manner, and for the purpose to be hereinafter pointed out.

Disposed parallel to automatic plate 22, and also mounted for rotation with flywheel 8, is a plate 28 which will hereinafter be termed the reaction plate because plate 28 takes the reaction of the automatic weights in a manner presently to be described. Referring more particularly to Figure 3 of the drawings, automatic plate 22 and reaction plate 28 are urged toward each other by means of bolts 29 that are threaded into automatic plate 22 at 31, and are encircled by compression springs 32 which seat at one end in the bottom of recesses 33 formed in reaction plate 28, and at the other end react against the heads of bolts 29. As seen in Figure 2 bolts 29 are three in number and are spaced at approximately 120° intervals about the periphery of plate 22 and 28 and are preferably located between the keyplate assemblies 25. While automatic plate 22 is keyed to rotate with flywheel 8, and bolts 29 may act to cause reaction plate 28 to rotate with automatic plate 22 and therefore flywheel 8, and when bolts 29 are properly designed this keying means is entirely satisfactory. I preferably, however, employ additional means for keying the reaction plate directly to flywheel 8 and this structure will now be described.

Spaced pairs of ears or lugs 34 (Figures 2 and 4) are provided on reaction plate 28 at approximately 120° intervals, and are preferably formed integral therewith and extend beyond the periphery thereof. Lugs 34 extend outwardly beyond the periphery of plate 28 into saddle members 35 which provide driving faces 36 that closely abut the opposite side of each lug assembly, and are adapted for sliding engagement therewith. Saddle members 35 are provided with a space indicated at 37 that is sufficient to accommodate lugs 34 throughout their entire range of sliding clutching and declutching movements. The lower ends of saddle members 35 are deflected to lie in a horizontal plane and are apertured and secured to the flat face of plates 25 by means of cap screws 38 or the like. It will be seen that by loosening screws 38, one or more of shims 27 which are slotted in the region of screws 38, may be inserted or removed from between plates 25 and the face of flywheel 8 for the purpose of adjusting the entire saddle assembly with relation to the flywheel face. Saddle members 35 are preferably formed of metal stampings. It will therefore be seen that reaction plate 28 is mounted for rotation with flywheel 8 in a very effective economical manner, and is at the same time permitted to move axially thereof throughout a limited range of movement for the purpose of permitting clutching and declutching operations to be performed.

Automatic plate 22 is normally urged toward the flywheel by means of a spring assembly consisting of a plurality of springs interposed between a pair of annular reacting members. To this end reaction plate 28 is provided with an annular seat 41, against which a reaction plate 42, having a flange 43, is adapted to rest. Plate 42 receives the reaction of a plurality of springs 45 and transmits it to plate 28, and is made of sheet metal suitably formed to give it sufficient rigidity for this purpose. Plate 42 is provided at suitable intervals around its periphery with depressed portions 44 which are adapted to center and form seats for one end of compression springs 45. Interposed between springs 45 and plate 42 are heat insulating washers 46 which may consist of any suitable material having heat insulating properties, for preventing the transfer of heat from reaction plate 28 to springs 45, so that their proper temper may be maintained even under severe conditions of abuse of the mechanism.

The other ends of springs 45 cooperate with an annular plate 47, which is provided with annular depressions 48 for centering them. Springs 45 may seat directly against plate 47 for the reason that no heat is generated by the elements in contact with plate 47. Plate 47 is provided at approximately 120° intervals about its periphery with offset portions 49 which receive the inner ends of throwout levers 51, and is suitably reenforced in these regions by suitable forming operations. The inner edge of plate 47 is provided with a flange extending toward the flywheel which terminates in an annular flange 52 which is normal to the clutch axis. Seating on flange 52, and preferably secured thereto by a spot welding operation or the like, is a relatively thick hard metal bearing ring 53. Ring 53, in response to the action of springs 45, is urged toward, and rests against curved faces 54 formed on throwout levers 51. While levers 51 are only three in number, ring 53, being of substantial thickness and rigidity, distributes the reaction pressure of throwout levers 51 around the entire periphery of flange 52, avoiding distortion thereof, and permitting use of relatively light gauge sheet metal in plate 47. The spring organization just described is low in cost and gives excellent practical results and is preferred, but it is to be understood that if desired springs 45 and members 42 and 47 could be replaced by a properly designed single spring of the type disclosed in the application of Charles B. Spase Serial No. 527,429, filed April 3, 1931, and good results obtained.

Throwout levers 51 are preferably three in number, so that ring 53, in response to the action of springs 45, is urged into a stable position on a three point support, and is thereby caused to exert an equal pressure upon each lever regardless of slight inaccuracies of the levers, holding the levers tight at all times in operation. The outer end of each throwout lever 51 is disposed between a pair of lugs 34, and is pivotally secured thereto by a pin 56, the ends of which are supported in holes formed in lugs 34. As the ends of pins 56 abut walls 36 of saddle members 35, no other means is required to hold them in assembled position in the mechanism. Provided on opposite faces of levers 51 are curved fulcrum faces 57 and 58 respectively. Each fulcrum face 57 cooperates with the outer face of plate 25 when declutching operations are being effected, and fulcrum face 58 cooperates with a hardened steel plug or bearing member 59 that is frictionally fitted in an aperture 61 formed in the top of each saddle member 35 at all other times. Plugs 59 reenforce the reacting portion of saddle members 35 against flexing in response to pressure exerted thereon by fulcrums 58, and at the same time present surfaces for cooperation with fulcrums 58, that have good wearing qualities.

It should be noted that there is no normal tendency for levers 51 to rotate in a plane normal to the clutch axis in response to rotation of the clutch mechanism, because they are disposed exactly radially thereto and have each end of their pivots 56 supported in lugs 34 so no tendency for them to bind is present.

In operation plate 28 is urged toward the flywheel by the direct pressure of springs 45 by virtue of their direct reaction, and plate 28 is further urged toward the flywheel by the outer ends of springs 45, which, through plate 47 and levers 51 exert an amplified force upon plate 28. When the inner ends of levers 51 are moved toward the flywheel, fulcrum faces 57 thereof will contact with the top of plates 25, urging pivots 56 away from the flywheel, and since pivots 56 are saddled in lugs 34 of plate 28, plate 28 will be withdrawn from engagement with disc 17. At all other times, fulcrum faces 58 formed on levers 51 are held in tight contact with plugs 59 by virtue of the pressure exerted on levers 51 by springs 45, urging plate 28 towards the flywheel. It will therefore be seen that automatic plate 22 and reaction plate 28 are held together as a unit by means of springs 32, and are both bodily normally urged toward the flywheel by means of springs 45, and by operating throwout levers 51, automatic plate 22 and reaction plate 28 may be withdrawn from driven member 17 and moved away from the flywheel.

The mechanism for causing declutching movements of throwout levers 51 will now be described. Cooperating with curved faces 61 formed on the inner extremities of levers 51 is the flat face of a ball race 62, which cooperates with anti-friction balls 63 disposed therebetween and a similar ball race 64. Ball races 62 and 64 are held in loosely assembled relation with respect to each other by means of retainer member 65. Ball race 64 is rigidly mounted upon a sleeve 66, which is slidably mounted upon a hollow supporting member 67 which is preferably integral with clutch casing 1, and is machined and ground so as to be disposed in exact alignment with shaft 5 when the clutch is assembled, and to provide a close sliding fit with sleeve 66. Supporting sleeve 67 is spaced substantially from and is independent of driven shaft 11. Sleeve 66 is provided with a tapped bore 69 into which a grease fitting 71 of well known construction is screwed. Bore 69 communicates with an axially extending passage 72 formed in sleeve 66 so that lubricant introduced through passage 69 provides lubrication for axial movements of sleeve 66 and also provides lubrication for the anti-friction ball bearing assembly through passage 72 and passage 73 communicating with the anti-friction bearing.

To prevent rotation thereof, sleeve 66 may be keyed or splined upon support 67 in any suitable manner, but I prefer to provide an apertured lug 74 on sleeve 66 which is slidably associated with a stud 75 threaded into housing 1. It will accordingly be seen that stud 75 prevents rotation of sleeve 66 but at the same time permits free axial sliding movement thereof upon its support 67. Formed on opposite sides of sleeve 66 are lugs 76 which cooperate with throwout fingers 77 mounted on throwout shaft 78 in well known manner to effect declutching movement of sleeve 66. Shaft 78 is journaled in and extends outwardly of the clutch housing and carries on the end thereof a conventional clutch pedal 79 for imparting rotational movements to shaft 78.

It will be particularly noted that driven shaft 11 fits loosely into supporting sleeve 67 which is stationarily mounted in the clutch housing or casing, and therefore substantial eccentricity or angular misalignments of driving shaft 5 and driven shaft 11 can have no effect whatever upon the operation of the throwout bearing assembly and its cooperation with levers 51. Moreover, since driving shaft 5 is the crank shaft of the engine, and the bearing face of the support 67 is carefully machined to lie exactly parallel to driving shaft 5, their permanent alignment is assured and the throwout bearing assembly, providing springs 45 are properly assembled, will cause plates 22 and 28 to be disposed exactly parallel to the flywheel face at all times, regardless of whether the clutch is engaged or disengaged. Moreover, levers 51 will be held tight at all times regardless of manufacturing inaccuracies or inaccuracies that arise due to wear, by the three point engagement of ring 53 wth the levers. During clutching and declutching operations the ends of levers 51 will also have a three point support on the face of the throwout bearing assembly while the throwout bearing is positively maintained in proper alignment by virtue of the stationary guiding means formed on the clutch housing, providing smooth clutch action with minimum pedal operating pressures at all times in a low cost construction requiring a minimum of manufacturing accuracy.

It should moreover be noted that due to the entire absence of an obstructing rim on the flywheel, and of the usual cover or any other structure associated with the clutch mechanisms that might impede air flow induced by the rotation of the clutch elements, or inhibit free radiation of heat therefrom, and also the plane face of the flywheel beyond the driving face thereof, dissipation of heat from the clutch elements by radiation and convection is extremely rapid and there is no tendency to cause overheating and drawing of the temperature of spring 45, even under severe conditions of slipping drive. Moreover, as the facing material wears, particles of solid lubricant and dust dislodged therefrom are free to leave the clutch mechanism and are carried away by the air stream induced by rotation of the clutch elements. To facilitate removal of this solid free lubricant and dust flywheel 8 is preferably provided with dished out portions 81 disposed between each saddle assembly. The absence of the usual rim on the flywheel materially reduces machining and production costs and adapts the mechanism readily to large volume low cost production methods. If this present clutch mechanism, however, is installed in an existing flywheel that is not provided with such dished out portions, the clutch will operate in a perfectly satisfactory manner.

In view of the fact that reaction plug 59 and automatic plate 22 and reaction plate 28 may be adjusted toward and away from the flywheel by means of shims 27, shims 27 may be inserted or withdrawn from the proper saddle member assemblies 37 to bring about proper parallel relation of parts. As has been pointed out, each plate 25 is held in place on flywheel 8 by means of a single bolt 26, which is independent of saddle member 37. Therefore, saddle members 37 may be removed from the clutch mechanism without in any way disturbing the shims 27, and a proper adjustment once established may readily be maintained. It is contemplated that the shim adjustment shall be an initial factory adjustment for the reason that after the clutch mechanism has been in use, there is no tendency for automatic plate 22 and reaction plate 28 to work themselves into non-parallel relation with the flywheel because the wear that does occur on the faces of each lever 51 will occur to an equal extent upon each of them since they are acted upon by an equal force, namely, one-third of the total pressure exerted by springs 45, due to the three point nature of the connection existing between the springs and the levers. Once the proper parallel relation of automatic plate 22 with flywheel 8 has been established, all other adjustments to compensate for wear of the clutch facing material are made externally of the mechanism. The clutch mechanism disclosed in Figure 1 is shown in what I term the automatic position with automatic plate 22 spaced from driven member 17, and with the parts in positions assumed when the engine is operating at idling speeds or is stationary.

To hold automatic plate 22 in intermediate or automatic position, a latch member 83 (Figure 8) is provided at one end with a clutch pedal engaging dog 84 and has the other end thereof pivotally connected at 86 to a suitable support 87 which may be secured to any stationary part of the vehicle such as 88 in any well known manner. Secured to latch member 83, adjacent the pivot thereof is a laterally extending finger 89 which is apertured to receive a control wire 91 which in turn is held in place therein by means of a set screw 92 or the like. Control wire 91 is held and guided in a suitable flexible casing 93, which is led to a suitable operating location in the interior of the vehicle, for instance, to the upper end of the vehicle steering column 94 where the upper end thereof is secured thereto by means of a clamp member 95 or the like. A friction control member 96 is incorporated in the upper end of casing 93 and serves to hold the control wire in any selected adjusted position. Provided on the upper end of wire 91 is a suitable operating knob 97 for shifting wire 91 lengthwise for shifting latch member 83 into operative and inoperative positions. With the parts shown in the positions they take in Figure 1, clutch pedal 79 and latch member 83 accordingly take the positions in which they are shown in Figure 8.

The preferred automatic speed responsive or centrifugal operating mechanism will now be described. The rear face of automatic plate 22 is provided with an annular recess 101 which is preferably rectangular in cross-section, and which provides a flat bottom face against which the automatic or centrifugal weights fulcrum and react to cause clutch engagement. Centrifugal weights, designated generically by reference character 102, are preferably six in number and are disposed between the holdback bolt assemblies and the saddle members. Each centrifugal weight preferably consists of a lever section 103 which terminates at its outer end in a pair of threaded extremities 104. Fitted over extremities 104 are a plurality of weight elements 105, which are identical in shape and are preferably made from sheet metal stampings. Weight elements 105 are held in place on extremities 104 by means of nuts 106 which are threaded thereon. Weight elements 105 are further provided with recesses 107 to allow swinging movements thereof without interfering with holdback bolts 29. Lever sections 103 are of substantial width and are received in rectangular recesses 108 formed in reaction plate 28. While lever sections 103 could cooperate with automatic plate 22 through rectangular apertures in reaction plate 28, the present construction is preferred for the reason that it materially reduces the cost of manufacturing and assembling the parts involved. Levers 103 carry at their extremities heads 109, each of which is provided with a flat face 111 that normally abuts the bottom face of annular recess or groove 101 in automatic plate 22 when the engine is operating at idling speed or is stationary. Heads 109 are also provided with a reaction face 112 which normally abuts face 113 of reaction plate 28 and is designed for fulcruming engagement therewith during operation of the weights. Heads 109 have their outer sides relieved to provide knife-like edges 114 which are adapted to rotate or pivot on the bottom face of recess 101 formed in automatic plate 22.

Referring more particularly to Figure 2 of the drawings, each extremity of knife edge 114 is seen to engage the outer wall of recess 101, while the inner face of head 109 engages the inner wall of recess 101, thereby preventing rotation of heads 109 and keeping them in proper assembled relationship at all times. In this connection it should be noted that when plates 22 and 28 are separated, heads 109 of weights 102 may be lifted out of recess 101, and the weights removed from the mechanism. This is a desirable feature because the weights can then be entirely assembled prior to their incorporation in the mechanism, thus cutting down production costs. Knife edges 114 are adapted to cooperate with the flat bottom face of recess 101 and thereby act in line contact upon plate 22 for a substantial distance across the face thereof, whereby uniform distribution of pressure around the entire area of the automatic plate is effected. It should be particularly noted that no expensive machining operations are required to provide accuracy of the centrifugal weights because annular groove 101 is readily machined in plate 22 in a single inexpensive operation and the weight heads are held in position therein during all stages of operation by a three point contact.

The mass of weight elements 105, and the number employed in a particular installation is determined by a consideration of the combined pressure that they must transmit for proper operation of the clutch mechanism. In the automatic drive and clutch mechanism shown, which is for a Plymouth automobile, six equally spaced weight assemblies are employed. It will therefore be seen, as the speed of the flywheel increases, each weight assembly 102 will gradually swing outwardly about the edge 114 as a pivot, in response to centrifugal force. As this occurs, reaction faces 112 of heads 109 will abut and slide on faces 113 of reaction plate 28, and knife edge 114, by virtue of its engagement and pivoting upon the flat bottom surface of annular groove 101 in automatic plate 22, will force automatic plate 22 into engagement with facing 20 of disc 17, thus causing disc 17 to move axially and bring the face 19 thereof into contact with the flywheel face. As this occurs, face 112 of head 109 will force reaction plate 28 away from the flywheel against the action of springs 45, which act directly upon plate 28 at one end, and act indirectly at the other end through the medium of levers 51 to resist movement of reaction plate 28 away from the flywheel. Accordingly, as weights 102 swing outwardly and bring the driving and driven members into clutching engagement, reaction plate 28 is forced away from the flywheel, and due to the resilient nature of the backing means therefor, should certain weights 102 swing further outwardly than the remaining weights, the pressure exerted thereby will nevertheless be uniformly distributed about the periphery of plate 22 for the reason that reaction plate 28 can take a slight angular position with respect to automatic plate 22, due to the fact that its sole movement limiting means is constituted by springs 45. For the purpose of compensating for such irregularity of weight action, reaction plate 28 may be made and so constructed as to have a semiflexible character so as to permit a slight distortion thereof during operation and thereby cause weights 102 to exert more uniformly distributed pressure upon automatic plate 22. If reaction plate 28 were not allowed to rock in the manner just described, the reaction thereof against outward movement of weights 102 would be equal, and if the outward movement of certain weights were greater than that of the remaining weights the resulting action of these weights would cause a greater force to be exerted upon automatic plate 22 in the regions against which they act, and therefore automatic plate 22 might be distorted as a result of such non-uniform application of force thereto and clutch engagement would not be as smooth as with the mechanism illustrated.

It will be further seen that movement of reaction plate 28 to the right under the influence of the centrifugal mechanism will cause the inner ends of levers 51 to move to the left of the position in which they are shown in Figure 1, through their interconnections by means of pins 56, with ears 34 of plate 28. Movement of pivots 56 to the right causes fulcrum faces 58 of levers 51 to engage and fulcrum about reaction plugs 59, with the result that the inner ends of levers 51 are moved to the left of the position in Figure 1. Therefore, levers 51 move entirely out of engagement with ball race 62 and no load whatever is placed upon the throwout bearing assembly during the clutch engagement operation or after the operation has been completed, thus producing a clutch mechanism that imposes no more load upon the throwout bearing assembly than that employed in manual clutches.

Referring to Figure 6 of the drawings, the centrifugal weight there disclosed is shown in its outermost position, and automatic plate 22 and reaction plate 28 are shown in their separated positions, at which time driven member 17, carrying faces 19 and 20, is clamped securely between automatic plate 22 and flywheel 8. To definitely limit the swinging movement of each weight assembly in its outward direction, a flange 115 is formed on the periphery of plate 28, which elements 105 are adapted to engage, thereby providing a definite stop for each centrifugal weight assembly so that at extremely high speeds excessive pressure between automatic plate 22 and the driven member cannot occur.

In Figure 7 of the drawings, centrifugal weight 102 is shown in its outermost position as in Figure 6, which corresponds to the conditions existing when the engine speed is substantially above idling speeds, and the clutch pedal is held in a depressed position which, through the medium of the throwout bearing assembly and throwout levers 51 has caused displacement of reaction plate 28 to the right. Movement of the plate 28 accordingly causes similar movement of automatic plate 22 because the two are interconnected with bolts 29 and springs 32 which also cause retraction of weights 102 when the engine speed has dropped to idling. With the parts in the position they assume in Figure 7, there is no driving connection between the driving and driven shaft and therefore the mechanism is manually declutched.

With the parts in the position they assume in Figure 1, and it is desired to effect a driving connection from the engine to the rear wheels, the vehicle may be placed in any gear desired and knob 97 operated to release latch 83 from the clutch pedal and thereby allow the clutch pedal to move into its retracted position. This retraction of the clutch pedal allows the throwout bearing assembly to move to the right under the influence of springs 45, which, acting through levers 51 brings reaction plate 28 and automatic plate 22 to the left of the positions in which they are shown in Figure 1, with automatic plate 22 in driving engagement with the driven member. Such operation is desirable for motor vehicle operation, since when the motor is cold and the battery is low, it is sometimes desirable to connect the driving and driven shaft in positive engagement so that the car can be pushed or coasted in order to turn the engine over. Also when stopping on a steep hill, positive engagement of the clutch in low or reverse gear will provide an additional emergency brake that cannot be inadvertently released, or if the motor stalls, due to lack of fuel or any other cause, the car can pull out of dangerous positions by propelling the car in low gear with the starting motor.

During all other normal driving operations, the throwout assembly is held in the position it assumes in Figure 1 of the drawings by means of latch member 83 cooperating with the clutch pedal. With the above described clutch mechanism installed in a motor vehicle having a conventional three speed transmission, if it is desired to start the vehicle, and the parts are in the position they are shown in Figure 1, and the vehicle is on substantially level ground, the transmission may be placed in high gear and the engine accelerated. As the engine accelerates, centrifugal weights 102 gradually swing outwardly and cause automatic plates 22 to move toward and force clutch member 17 against the flywheel in the manner previously described. As weights 102 swing further outwardly, driven member 17 is clamped between automatic plate 22 and the flywheel and torque is transmitted to the rear wheels. It should be noted that movement of automatic plate 22 away from reaction plate 28 is opposed by holdback springs 32, and therefore weights 102 are held under control and do not vibrate or undergo any other desirable movements. As the weights swing further outwardly, they react against plate 28 and cause pressure to be gradually built up in springs 45, and this gradual build up of pressure in springs 45 causes a torque of gradually increasing magnitude to be transmitted to the rear wheels of the vehicle. The vehicle is thus started smoothly and without shock. When the vehicle, and consequently the engine, obtains sufficient speed, weights 102 will have swung out to their furthermost limits in contact with flange 115, and the plates will be in firm driving engagement with no slippage between them, and an automatic drive is thus established from the driving to the driven shaft.

When operating the vehicle in this manner, all that is necessary to bring it to a stop is to release the accelerator and apply the brakes. When the vehicle has decelerated to a speed corresponding substantially to idling speed through the combined braking action of the engine and the brake mechanism, centrifugal weights 102 will move inwardly to their neutral positions under the influence of holdback springs 32, and release the clutch. The vehicle may then be brought to a complete stop by continued application of the brake, or, if traffic conditions permit, the accelerator may be depressed and the engine speed accelerated to cause almost immediate reengagement of the clutch and the vehicle may thus again be picked up in high gear. Due to its slipping drive characteristics, the present mechanism constitutes a drive mechanism as well as a clutch, and while it does not multiply the torque delivered by the engine, it may be designed to permit the engine to apply its maximum torque to the driven member permitting operation of a motor vehicle under normal driving conditions entirely in high gear, and requiring gear shifting only when quick acceleration of the load from rest is desired or when starting on a grade.

As has previously been pointed out, when the automatic plate, in response to weights 102 has moved to engaging position against the action of hold back springs 32, and lies in contact with flange 115, automatic plate 22, and reaction plate 28 may be backed away from the driven member by manual actuation of the clutch pedal. There is then no contact between the plates and no driving connection between the driving and driven shafts. In traffic, when it is desired to get the vehicle away quickly and in starting up grades, the clutch pedal may be operated in this manner to disengage the clutch between each gear shifting operation as in a vehicle of the type provided with a manually operable clutch. However, with the present drive and clutch mechanism, it is contemplated to start the vehicle in high gear under normal operating conditions.

It will therefore be seen that a low cost, highly effective, simplified automatic or self operating clutch mechanism has been provided in which slight inaccuracies in machining, or assembly or due to wear in use, have no substantial effect, and which will automatically apply uniformly distributed pressure to the automatic plate, and such uniform pressure applying qualities will not be materially altered due to wear of the parts. Moreover, the clutch mechanism may be operated in precisely the same manner as the conventional manually operable clutches of today, and a pedal pressure no greater than that required for similar manual clutches is required for declutching.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a driving member, a driven member; a reaction member; speed responsive means for causing said driving member to engage said driven member when said driving member reaches a predetermined speed and reacting against said reaction member; spring means for resisting movement of said reaction member in response to operation of said speed responsive means; and force amplifying means associated with said spring means and said reaction member for causing the reaction of said spring means to further act upon and yieldingly resist movement of said reaction member.

2. The automatic drive and clutch mechanism set forth in claim 1 wherein means are operably associated with said force amplifying means for causing said driving member and said reaction member to move away from said driven member against the action of said spring means.

3. In a clutch mechanism, a driving member, a driving plate mounted for synchronous rotation with said driving member and adapted to move axially thereof; frictional means disposed between said member and plate and adapted to be frictionally gripped thereby; an axially movable reaction plate; resilient means urging said reaction plate in one direction; and a plurality of levers, said levers having laterally extending portions adapted to act against plane surface portions of said driving plate and react against plane surface portions of said reaction plate and force said frictional means into engagement with said driving plate, and said driving member, means for causing the laterally extending portions of said levers to rock about definite axes in line contact with the plane surface portions of said driving plate, and operable to prevent the line of contact from shifting outwardly with respect to said driving plate during actuation of said levers.

4. In an automatic drive and clutch mechanism, a driving member; a driven member; a reaction plate; centrifugally operable means for causing said driving member to move into engagement wtih said driven member when said driving member reaches a predetermined speed, said means comprising a plurality of fulcruming elements having fulcrums adapted to act upon the bottom wall of an annular groove in said driving member and having fulcrums adapted to react against said reaction plate; said fulcruming elements being held in assembled relation with respect to said driving member and reaction plate by said annular groove; resilient means for resisting movement of said reaction plate in response to said fulcruming elements, and means for moving said driving member away from said driven member against the action of said resilient means.

5. An automatic unit clutch assembly adapted to cooperate with the clutch and driving face; the driven member; and the manual clutch control pedal of an automotive flywheel clutch construction, somprising a plurality of supporting members adapted to be secured to and be driven by the flywheel, an automatic plate carried and driven by said suporting members and adapted to force said driven clutch member into engagement with said flywheel driving face; speed responsive mechanism cooperating with said automatic plate and being automatically operable to force said automatic plate into engagement with the driven clutch member and cause the latter to engage the flwheel driving face; a reaction plate for cooperation with said speed responsive mechanism and carried by said supporting members; resilient means adapted to act upon said reaction plate, and means carried by said supporting members and operable by the clutch pedal to effect disengagement of driven clutch member and flywheel driving face, comprising a mechanism operative to apply the multiplied reaction of said resilient means to said reaction plate.

6. In an automatic clutch, a driving member mounted for rotation and having a frictional surface disposed substantially normal to its axis and having ap art providing a spring seating surface axially spaced therfrom; an automatic plate disposed between said surfaces and mounted for axial movement; a driven member disposed between said frictional surface and said automatic plate; a reaction plate disposed between said automatic plate and said spring seating surface; compression spring means disposed between and acting against said reaction plate and said spring seating surface and constantly tending to bring said automatic plate into engagement with said driven member; a plurality of levers connected to said reaction plate; an axially movable throwout bearing cooperating with said levers; a stop device for limiting axial movement of said throwout bearing and operable to hold said reaction and automatic plates in disengaging position against the action of said compression spring means when the driving member is operated at idling speeds or is stopped; and speed responsive means for forcing said reaction and automatic plates away from each other when they obtain a predetermined speed above idling speed, so as to cause said driven member to be gripped between said frictional surface and said automatic plate, said stop device being operable at will to release said reaction plate and allow said compression spring means to force automatic plate into engagement with said driven member at any speed of operation of said driving member below said predetermined centrifugal engaging speed.

ROBERT P. LEWIS.